United States Patent [19]
Sutherland et al.

[11] 4,391,139
[45] Jul. 5, 1983

[54] PLASTIC WATER METER MAIN CASE

[75] Inventors: Ray Sutherland, Hopewood; Mark S. Wood, Lemont Furnace, both of Pa.

[73] Assignee: Rockwell International Corporation, Pittsburgh, Pa.

[21] Appl. No.: 351,827

[22] Filed: Feb. 24, 1982

[51] Int. Cl.³ .............................................. G01F 15/14
[52] U.S. Cl. .................................................... 73/273
[58] Field of Search ................. 73/253, 254, 255, 256, 73/257, 258, 273

[56] References Cited

U.S. PATENT DOCUMENTS

| 3,100,993 | 8/1963 | Wetjen | 73/273 |
| 3,523,455 | 8/1970 | Branitzky | 73/273 |
| 4,061,032 | 12/1977 | Friebel | 73/273 |

FOREIGN PATENT DOCUMENTS 2337465  2/1975  Fed. Rep. of Germany ........ 73/273

*Primary Examiner*—S. Clement Swisher

[57] ABSTRACT

A water meter is disclosed in which the main case is of plastic material and is particularly structured for ease of molding with relatively simple molds in that no undercuts are formed on the main case which would require complicated molds and molding practices.

4 Claims, 5 Drawing Figures

PLASTIC WATER METER MAIN CASE

BACKGROUND OF THE INVENTION

1. Field of the Invention

This invention relates to water meters and is particularly directed to water meters in which the main case is formed of plastic material.

2. Description of the Prior Art

Conventional water meters typically are comprised of a main case which encloses a compartment into which a measuring chamber is received through a suitable opening in the case. A closure member is provided to close the opening in the main case and retain the measuring chamber in the compartment. Normally, the measuring chamber which is generally circular shaped in plan, has a downwardly facing seating surface which is received on a corresponding upwardly facing seating surface in the main case so that when the measuring chamber is seated on the upwardly facing seating surface in the main case, the inlet chamber is thereby isolated from the outlet chamber. As will be explained in more detail hereinafter, the prior art utilizes an upwardly facing seating surface within the main case which is a complete circle which corresponds and mates with the downwardly seating surface on the measuring chamber which likewise is a complete circle. However, in order to form the complete seating surface in a complete circle as will be explained in more detail below, it is necessary to provide an undercut in the main case which requires the use of a core with the main case mold thereby increasing the cost of the mold and the cost of the molding procedure. Alternatively, the undercut may be avoided in such cases by simply filling the undercut space with plastic material from which the main case is formed. This however adds significant cost to the main case.

SUMMARY OF THE INVENTION

Applicants have devised a main case and a mating measuring chamber whereby the above disadvantages of the prior art are avoided. In applicants' main case, the wall circumscribing the measuring chamber on which the upwardly facing seating surface is formed is circular for a major portion of its extent, but in the vicinity of the outlet of the measuring chamber compartment the wall diverges outwardly toward the outlet of the meter and the upwardly facing seating surfaces are formed on the top of the wall with no under cuts or ledges projecting from the wall. Thus the wall on which the upwardly facing seating surfaces are formed, and the seating surfaces formed thereon, diverge from a circular shape at the outlet side of the main case. The downwardly facing seating surface on the measuring chamber is complementarily formed in that it is circular in shape for a major portion of its extent but in the vicinity near the outlet a lip projects which seats on the seating surface formed on the vertical wall within the meter. As will more clearly appear from the detailed description below, such a construction avoids undercuts in the interior of the main case and does not require the use of excessive amounts of plastic material from which the main case is formed.

DESCRIPTION OF THE PREFERRED EMBODIMENT

Figure 1:
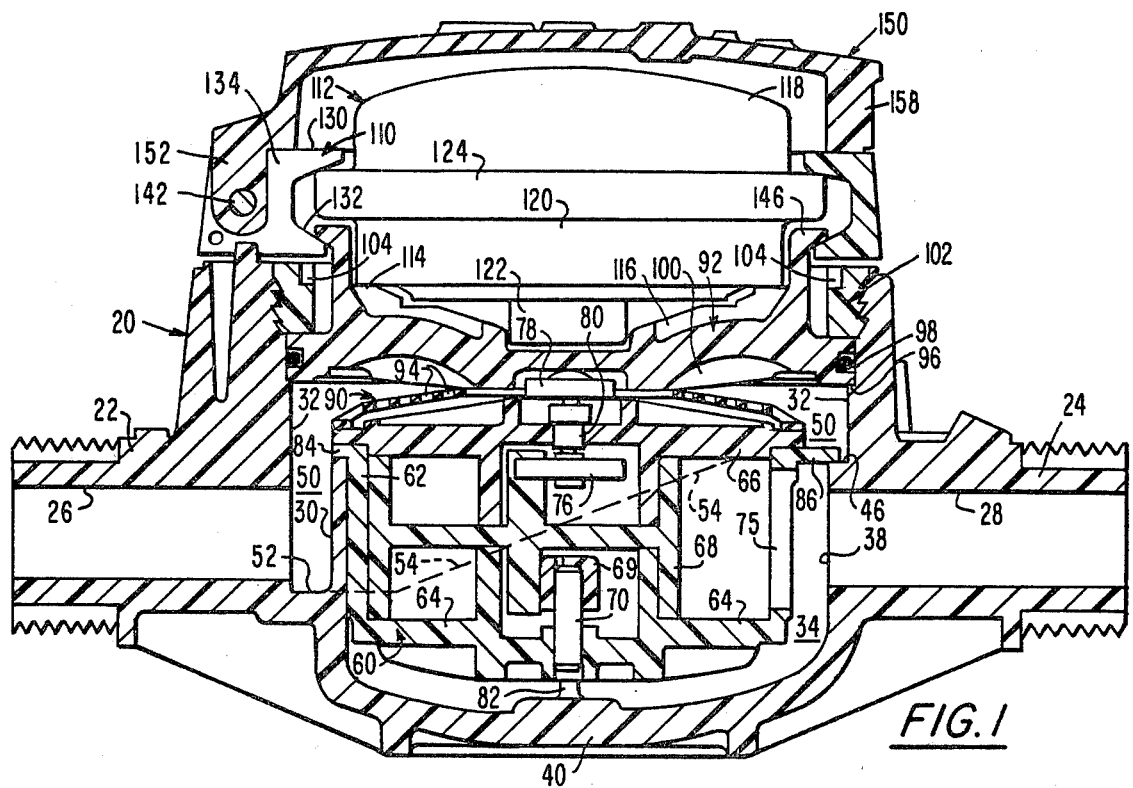
FIG. 1 is a vertical sectional view of a meter employing the instant invention.
Figure 2:
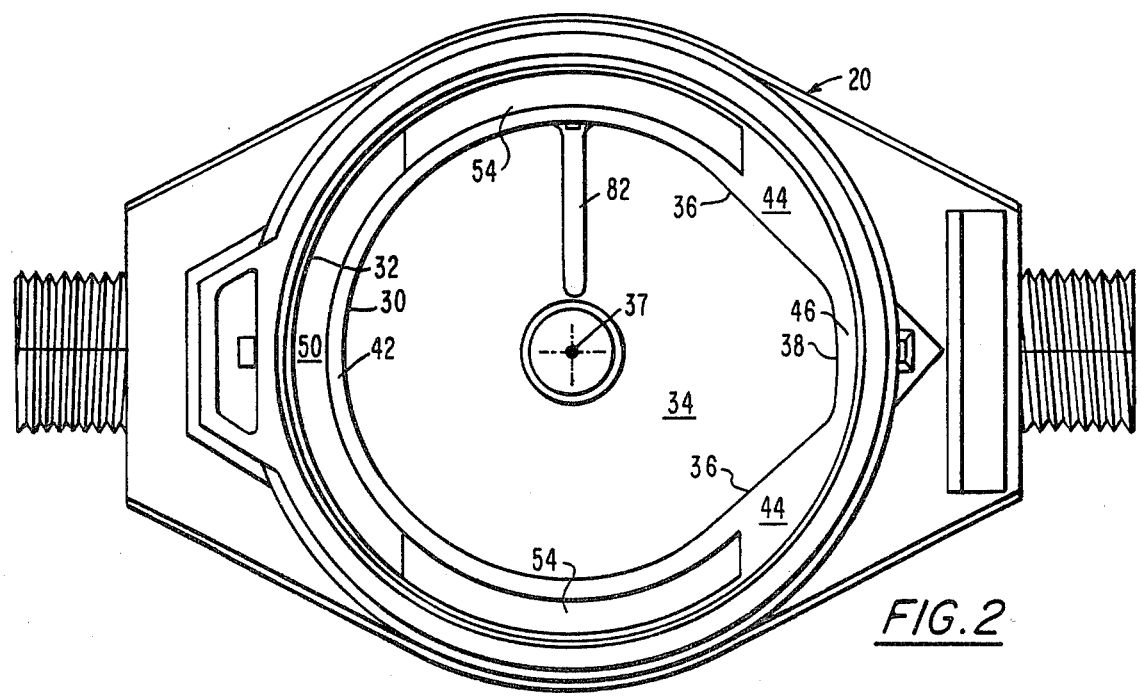
FIG. 2 is a top plan view of the main case shown in FIG. 1 with the interior elements, register clamping ring and cover removed to expose the various chambers and seating surfaces within the main case.

Referring particularly to FIGS. 1 and 2, the meter is comprised of a generally hollow main case 20, the interior of which opens upwardly and has a closed bottom wall 40. Inlet and outlet spuds 22 and 24, respectively, are formed on opposite sides of the main case with inlet passage 26 and outlet passage 28 formed in spuds 22 and 24, respectively, and which communicate with the interior of the main case 20. A measuring chamber compartment 34 is defined by interior side wall portions 30, 36, 38 and bottom wall 40 of the main case. Wall portion 30 is circular in form and concentric with interior wall 32 of the main case. At the outlet end of compartment 34, wall portion 38 is formed on the interior of the main case at a distance from the center or axis 37 of the main case somewhat greater than the radius of circular wall portion 30. Wall portions 36, also formed on the interior of the main case, are substantially straight, as viewed in FIG. 2, and serve to connect circular wall portion 30 with wall portion 38. Co-planar seating surfaces 42, 44 and 46 are formed respectively on the tops of wall portions 30, 36 and 38. Thus, a continuous seating surface is formed comprised of the surfaces 42, 44 and 46.

An inlet chamber 50 which is in communication with inlet passage 26 is defined between walls 30, 32, bottom wall 52 and inclined ramps 54, shown in dotted lines in FIG. 1, which merge at one end with bottom wall 52 of the inlet chamber 50 and at the other end with seating surfaces 44.

Figure 3:
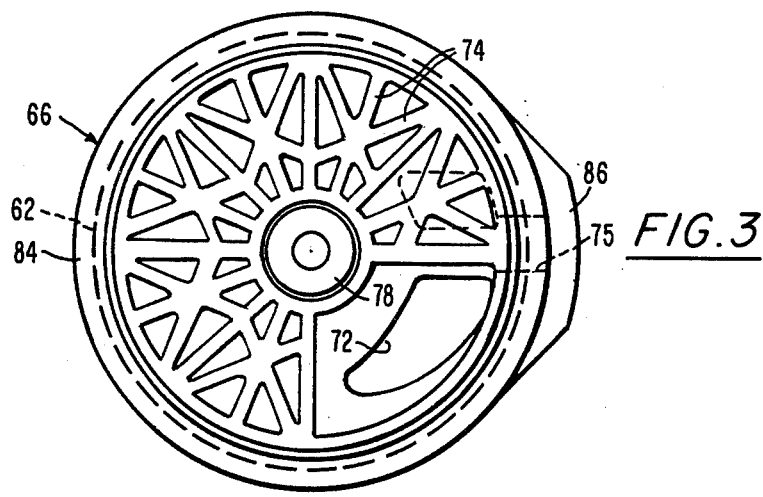
FIG. 3 is a top view of the measuring chamber shown in section of FIG. 1.

A measuring chamber identified generally by the numeral 60 (FIGS. 1 and 3) is received within compartment 34 and is comprised of a circular side wall 62, a bottom wall 64 and a top wall 66. An oscillating piston 68 within the measuring chamber 60 is guided for oscillating movement within the measuring chamber 60 about a bushing 69 on guide pin 70 projecting upwardly from bottom wall 64. An inlet 72 is formed in the top wall 66 as best shown in FIG. 3. The top wall 66 is provided with a lattice-work of strengthening ribs, two of which are denoted by the number 74 in FIG. 3. An outlet 75 is formed in the vertical wall 62 adjacent outlet passage 28 in spud 24 as best shown in FIG. 1. A locating rib 82 projecting upwardly from the interior surface of bottom wall 40 projects into a complementary recess formed in the bottom of the measuring chamber to insure proper positioning of the measuring chamber within the main case during assembly.

In operation, fluid enters the measuring chamber through inlet 72 and leaves the measuring chamber through outlet 75. If desired, a further outlet may be provided in the bottom wall 64 to enhance flow through and minimize pressure drop across the measuring chamber. The flow of water through the measuring chamber causes the piston 68 to oscillate in a manner well known to those familiar with this art and in a manner similar to that described in U.S. Pat. No. 2,857,763. The oscillations of the piston 68 rotate a crank 76 journalled for rotation within the measuring chamber which, in turn, rotates a driving magnet 78 by means of a sealed drive indicated generally by the numeral 80.

A circumferential lip 84 is formed around the top of the vertical wall 62 of the measuring chamber and has a projecting portion 86 formed near the inlet and outlet portion of the measuring chamber. The bottom surfaces of the lip 84 and the projection 86 are coplanar and form a continuous seating surface which seats on the seating surfaces formed by the upwardly facing seating surfaces 42, 44 and 46 on walls 30, 36 and 38. Thus, when the bottom surfaces on lip 84 and projection 86 are firmly seated on surfaces 42, 44 and 46, the inlet chamber 50 is sealed from the measuring chamber compartment 34 which may be considered an outlet chamber since it communicates directly with outlet passage 28.

A concave-convex dish shaped strainer 90 is interposed between a pressure plate 92 and the top wall 66 of the measuring chamber. Strainer 90 is preferably made of Acetal material and has a multiplicity of perforations 94. The circular pressure plate 92, is seated on a shoulder 96 formed on the interior of the main case 20. A convention "O" ring seal 98 around the periphery of the pressure plate seals the chamber 50 against the leakage of fluid past pressure plate 92. A series of radially extending ribs 100 is formed in the bottom of the pressure plate and a series of similar radially extending ribs 116 are formed on the top of the pressure plate and enable it to withstand the fluid pressure within chamber 50. Coplanar surfaces 114 on ribs 116 provide an interrupted plane on which the bottom of register 112 is seated.

A retainer ring 102, is externally threaded and adapted to be threadedly received into the top portion of the interior of main case 20 as shown in FIG. 1. The retainer ring 102 is provided with circumferentially spaced upwardly opening recesses 104 to receive a tool for threading the ring 102 into and out of the main case. When the retainer ring is threaded into the interior of the main case, the pressure plate 92 is held against shoulder 96. In this position the central portion of the strainer 90 which, as described above, is made of resilient Acetal material is deflected downwardly a sufficient amount so that the periphery of the strainer 90, which bears against the top wall of the measuring chamber, forces the downwardly facing co-planar surfaces of the lip 84 and projection 86 into sealing engagement with seating surfaces 42, 44 and 46 formed respectively on walls 30, 36 and 38. It can be seen that as the water flows through the inlet 26 and into the chamber 50 it passes through the openings 94 in the screen 90 into inlet 72 of the measuring chamber. Thus, the screen 90 performs the dual function of filtering or screening out foreign matter from the water to prevent their passage into the measuring chamber as well as providing a bias or seating force for the seating surfaces on the measuring chamber and the walls of the measuring chamber compartment. Because of the resiliency of the material from which the strainer is made and its dish-like configuration, with the thrust of the pressure plate being applied to the central portion of the strainer and transferred to the measuring chamber at the peripheral portion of the strainer, the central portion of the strainer may be flexed or displaced a considerable distance without any significant variation in the thrust in the measuring chamber. Thus considerable variations in the position of shoulder 96 and the vertical position of the top peripheral surface of the measuring chamber will not result in excessive or inadequate seating pressure on the measuring chamber.

Referring again to FIG. 1 a clamping ring 110, serves to clamp a register mechanism identified generally by the numeral 112 in the assembly against an interrupted annular plane formed by co-planar surfaces 114 on radially extending strengthening ribs 116. The upper portion 118 of the register 112 is made of some suitable transparent material such as lucite to facilitate reading of the indicator contained within said upper portion, and a lower portion 120 which includes a depending well portion 122 may be formed of a metallic material. The upper portion 118 and lower portion 120 are joined by rolling a peripheral portion of the lower portion 120 over a lip formed in the upper portion 118 to produce a circumferential rim 124.

As shown in FIG. 1, ring 110 has two annular inwardly extending legs 130 and 132. Clamping ring 110 is not a complete circle but has two opposed free end portions one of which is shown at 134, between which a hinge portion 152 of cover 150 is received. The cover 150 is hinged to the clamping ring by means of a screw 142 which passes through the hinge portion 152 of the cover and extends into and between the free ends of the clamping ring. Since the clamping ring 110 is made of the relatively flexible plastic material, to assemble onto the meter, the ring is flexed to displace the free ends away from each other sufficiently to mount the ring on the upper portion of pressure plate 92 whereby the annular legs 130 and 132 will embrace the rim 124 on the register and rim 146 on the pressure plate. The leg 130 of the ring will then circumscribe the upper portion of the rim 124 and the lower leg 132 will circumscribe the rim 146 on pressure plate 92. When the screw 142 is tightened down, the free end portions 134 and 136 of the ring will be brought closer together and since the lower surface of leg 130 and the upper surface of leg 132 are inclined, as the diameter of the ring is in effect reduced the bottom portion 120 of the register mechanism will be clamped against the interrupted plane comprised of the surfaces 114 on ribs 116.

Figure 4:
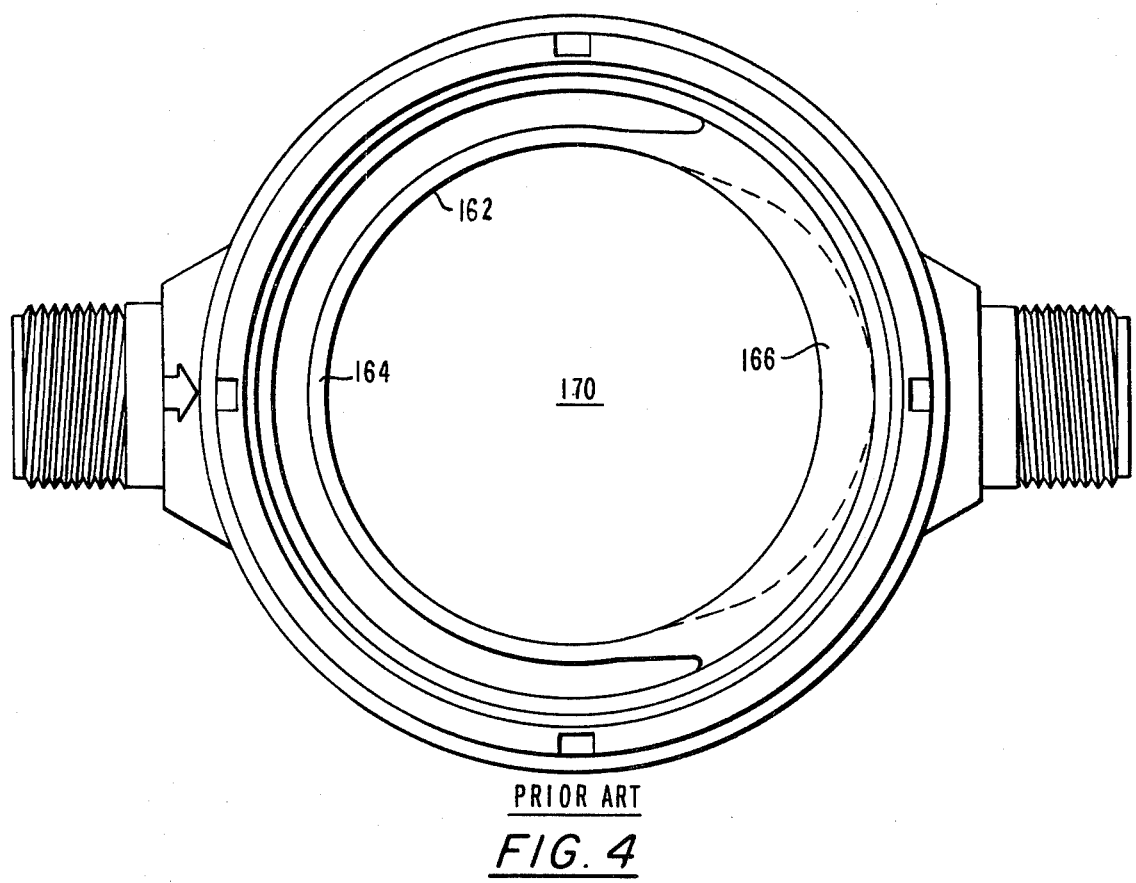
FIG. 4 is a top plan view of a prior art main case showing the conventional design which requires an undercut in the body and the use of a core with the mold in order to produce the undercut.
Figure 5:
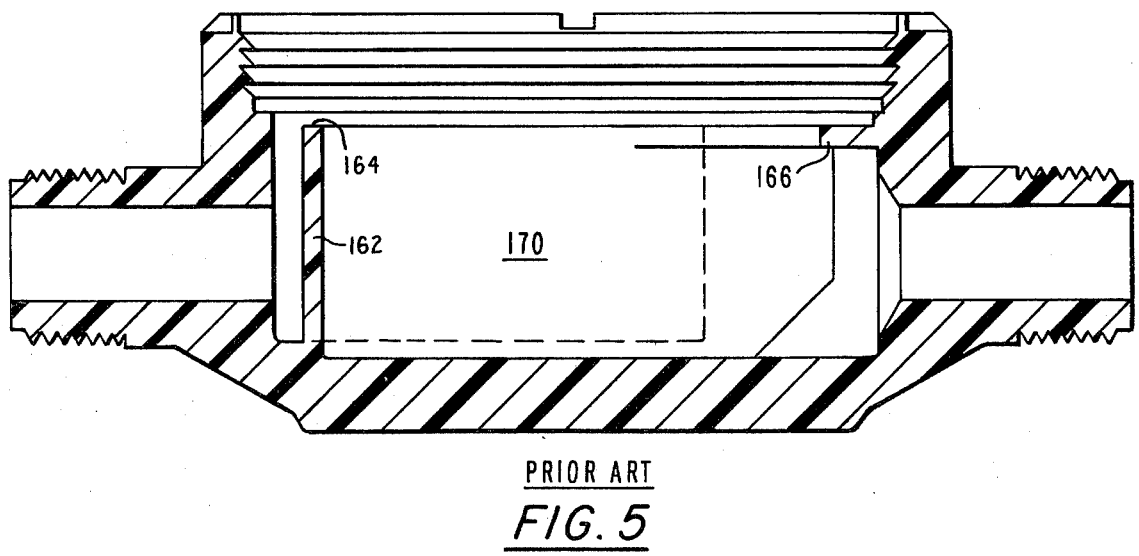
FIG. 5 is a vertical sectional view of the main case shown in FIG. 4.

It will be noted that because of the projection 86 on the measuring chamber which extends over and seats on seating surfaces 44 and 46 there are no undercuts formed in the main case 20 so that the molds for producing the main case 20 are rendered relatively uncomplicated. In other words, if the circular wall 30 were extended completely around the interior of the meter and the seating surface 42 constituted a completed circle around axis 37, as is conventional in the prior art as shown in FIGS. 4 and 5, either the space between the circular wall adjacent the outlet would have to be filled with the material of the main case, thus requiring a greater amount of material, or a seating surface would have to be formed which projects from the interior wall near the outlet in order to form a continuous seating surface. In FIGS. 4 and 5 a measuring chamber compartment 170 is circumscribed by a vertical wall 162 which has an upwardly facing circular seating surface 164 at its top. In order to provide a continuous seating surface which describes a complete circle to mate with a similarly continuous downwardly facing seating surface describing a complete circle on the prior art measuring chamber (not shown), it is necessary to provide a ledge 166 which projects from the inner wall of the main case. The ledge forms an undercut region beneath it which requires a mold core and therefore results in a relatively complicated and expensive mold and molding process. Thus Applicants' invention has provided a plastic meter main case adapted to be produced from simple and inexpensive molds and uncomplicated molding procedures.

The invention herein described may be embodied in other specific forms without departing from the essential characteristics thereof. The present embodiment therefore is to be considered as illustrative, the scope of the invention being indicated by the appended claims. All departures from the foregoing description which come within the meaning and range of equivalency of the claims are therefore intended to be embraced herein.

We claim:

1. A water meter comprised of a main case enclosing an inlet chamber and a generally circular measuring chamber compartment, inlet and outlet passages in said main case communicating respectively with said inlet chamber and said compartment, a continuous compartment seating surface circumscribing said compartment including a first portion which is circular and concentric with the axis of said compartment and a second portion at a radial distance from said axis greater than the radius of said first portion, said portions of said seating surface being co-planar, a generally circular measuring chamber having a continuous downwardly facing seating surface circumscribing said measuring chamber and seated on said compartment seating surface and comprised of a first measuring chamber seating surface portion which is circular and coextensive and co-axial with said first portion of said compartment seating surface, and a second measuring chamber seating surface portion which projects beyond the radius of said first measuring chamber seating surface portion and is seated on the second portion of said compartment seating surface.

2. The invention defined in claim 1 in which said compartment is circumscribed by a vertical wall free of undercuts.

3. The invention defined in claim 2 in which the circular portion of said vertical wall is spaced from and co-axial with a circular wall formed on the interior of said main case and said inlet chamber is defined between said two vertical walls, a bottom wall and an inclined wall extending from said bottom wall the plane of said compartment seating surface.

4. A water meter comprised of a main case enclosing an inlet chamber and a generally circular measuring chamber compartment, inlet and outlet passages in said main case communicating respectively with said inlet chamber and said compartment, a continuous wall circumscribing said compartment including a circular first wall portion, and a second wall portion formed at a radial distance from the axis of said circular wall portion greater than the radius of said circular wall portion, a continuous seating surface on said wall comprised of a first seating portion formed on said first wall portion and a second seating surface formed on said second wall portion, said portions of said seating surface being co-planar, a generally circular measuring chamber having a continuous seating surface circumscribing said measuring chamber and seated on said compartment seating surface and comprised of a first measuring chamber seating surface portion which is circular and coextensive and co-axial with said first portion of said compartment seating surface, and a second measuring chamber seating surface portion which projects beyond the radius of said of first measuring chamber seating surface portion and is seated on the second portion of said compartment seating surface.

* * * * *